United States Patent
Lu

[11] Patent Number: 6,131,608
[45] Date of Patent: Oct. 17, 2000

[54] WATER FLOWRATE CONTROL DEVICE

[76] Inventor: Ke-Way Lu, 3F, No. 322, Sec. 6, Min-Chuan E. Rd., Taipei City, Taiwan

[21] Appl. No.: 09/328,162

[22] Filed: Jun. 8, 1999

[51] Int. Cl.[7] .......................... F16K 31/385; F16K 31/44
[52] U.S. Cl. ............................ 137/550; 251/46; 251/230; 251/339
[58] Field of Search ............................... 137/550; 251/33, 251/45, 46, 230, 339

[56] References Cited

U.S. PATENT DOCUMENTS

| | | | |
|---|---|---|---|
| 3,652,053 | 3/1972 | Poitras et al. | 251/38 |
| 4,456,222 | 6/1984 | Shen | 251/230 |
| 4,771,985 | 9/1988 | Gross et al. | 251/230 X |
| 4,840,351 | 6/1989 | Lii | 251/230 |
| 5,573,224 | 11/1996 | Kim | 251/230 X |
| 5,651,531 | 7/1997 | Lu | 251/230 X |
| 5,704,397 | 1/1998 | Lu | 251/339 X |

*Primary Examiner*—John Rivell
*Attorney, Agent, or Firm*—Ladas & Parry

[57] ABSTRACT

A water flowrate control device, which includes a casing connected to water source means, a holder member mounted inside the casing, a pressure release element mounted in the holder member, a steel ball put in a stepped through hole in the pressure release element, a rubber cap mounted on the holder member and covered over the pressure release element and disposed in contact with an inside annular flange inside the casing to stop water passage, a bottom cap fastened to the casing at a bottom side to hold the holder member in place, a receptacle mounted in a tubular flange in the bottom cap, a movable element mounted in the receptacle and inserted into the stepped through hole at the pressure release element, and a spring member connected between the holder member and the movable element to push the movable element away from the steel ball, wherein when the receptacle is pushed upwards, the movable element is moved with the receptacle to push the steel ball upwards, for enabling water to flow out of the rubber cap so that the rubber cap is compressed by water pressure in the inside annular flange of the casing and released from the inside annular flange of the casing for enabling water to flow through water holes at the holder member and water holes at the bottom cap to the outside of the casing.

7 Claims, 5 Drawing Sheets

WATER FLOWRATE CONTROL DEVICE

BACKGROUND OF THE INVENTION

The present invention relates to a water flowrate control device designed for fastening to the water outlet of a water tap, and more particularly to such a water flowrate control device which comprises a cylindrical receptacle protruded from the bottom side for operation by hand to control the water passage.

A regular water tap generally comprises a lever for operation by hand to close/open the water passage. Water washing, the user must operate the lever with the clean hand to close the water passage. When closing the lever, the hand may be contaminated again. In order to eliminate this problem, there is provided an infrared sensor-controlled water tap which uses an infrared sensor to detect the presence of hand, and to automatically open the water passage upon such a detection. However, this infrared sensor-controlled water tap is quite expensive. There is also known a touch control type water tap as indicated in Taiwan Patent #82211700. This structure of water tap comprises a main water passage having a vertical section and a horizontal section perpendicularly extended from the vertical section at one side, a water outlet at the bottom end of the vertical section of the water passage, an upper valve and a lower valve respectively mounted in the main water passage in the connection area between the horizontal section and the vertical section of the main water passage, a connecting rod connected between the upper valve and the lower valve, and a sub-water passage extended from the connection area between the horizontal section and the vertical section of the main water passage, a drain hole adjacent to the vertical section of the main water passage, a connecting hole connected between the drain hole and the vertical section of the main water passage, a pressure release valve controlled to close/open the connecting hole between the drain hole and the vertical section of the main water passage, a handle connected to the pressure release valve and extended to the outside for touching by hand. When touching the handle with the hand, the connecting hole is opened, the upper valve is lifted due to a pressure difference, and the lower valve is moved upwards with the upper valve, enabling water to pass out of the water outlet. When the connecting hole is closed again, the pressure difference disappears, and the lower valve is returned to its former position, and therefore water is stopped from passing out of the water tap. This structure of water tap is functional. However, because the handle is exposed to the outside, it tends to be touched due to an error, causing water to flow out of the water tap. Furthermore, this water tap cannot be directly attached to an existing water tap.

SUMMARY OF THE INVENTION

It is the main object of the present invention to provide a water flowrate control device which can be directly attached to an existing water tap to control its water flowrate. It is another object of the present invention to provide a water flowrate control device which can easily be operated by touch to close/open the water passage. The water flowrate control device according to the present invention comprises a casing, the casing comprising a water inlet at a top side thereof, and an inside annular flange below the water inlet; a holder member mounted inside the casing and suspended below the inside annular flange, the holder member comprising a flat, circular bottom plate having a top side and a bottom side, an endless upright outer wall raised from the top side of the bottom plate, a split, endless upright inner wall raised from the top side of the bottom plate, a first receiving space defined within the upright inner wall, a second receiving space defined within the upright outer wall around the upright inner wall, a center through hole through the center of the bottom plate in communication with the first receiving space, and a plurality of water holes respectively provided through the bottom plate around the upright outer wall; a pressure release element mounted in the first receiving space inside the holder member and secured to the center through hole at the center of the bottom plate of the holder member, the pressure release element comprising a longitudinal top center hole extended to a top side thereof, and a longitudinal bottom center hole downwardly extended from the longitudinal top center hole to the center of a bottom side thereof; a steel ball put in the longitudinal top center hole in the pressure release element to stop the longitudinal bottom center hole of the pressure release element, the steel ball having an outer diameter smaller than the longitudinal top center hole of the pressure release element but greater than the longitudinal bottom center hole of the pressure release element; a rubber cap mounted in the second receiving space in the holder member and covered over the upright inner wall of the holder member and the pressure release element and stopped against the inside annular flange of the casing, the rubber cap comprising a center through hole disposed in communication with the water inlet through the inside space of the inside annular flange of the casing; a bottom cap fastened to the casing at a bottom side, the bottom cap comprising a substantially tubular flange suspended on the inside, a cam at the tubular flange at a top side, a plurality of positioning grooves provided at the tubular flange on the inside, and a plurality of water holes spaced around the tubular flange for guiding water out of the casing; a receptacle mounted in the tubular flange in the bottom cap, the receptacle comprising a top receiving hole, an inner cam disposed around the top receiving hole, and an outer cam disposed around the inner cam and positioned in the positioning grooves at the bottom cap; a movable element mounted in the receptacle, the movable element comprising a base supported above the receptacle, a top rod upwardly raised from the base and inserted into the longitudinal bottom center hole of the pressure release element, and a bottom rod downwardly extended from the base and inserted into the top receiving hole at the receptacle, the top rod having a plurality of equiangularly spaced and longitudinally extended grooves, the base comprising a plurality of peripheral blocks spaced around the periphery thereof and respectively supported between the outer cam and the inner cam at the receptacle, and a plurality of projecting portions raised from a top side wall thereof; and a spring member connected between the bottom plate of the holder member and the projecting portions at the base of the movable element; wherein when the receptacle is pushed upwards, the movable element is moved with the receptacle to push the steel ball upwardly away from the longitudinal bottom center hole of the pressure release element for enabling water to flow out of the inside space of the rubber cap so that the rubber cap is compressed by water pressure in the inside annular flange of the casing and released from the inside annular flange of the casing for enabling water to flow through the water holes at the bottom plate of the holder member and the water holes at the bottom cap to the outside of the casing.

DETAILED DESCRIPTION OF THE PREFERRED EMBODIMENT

Figure 1:
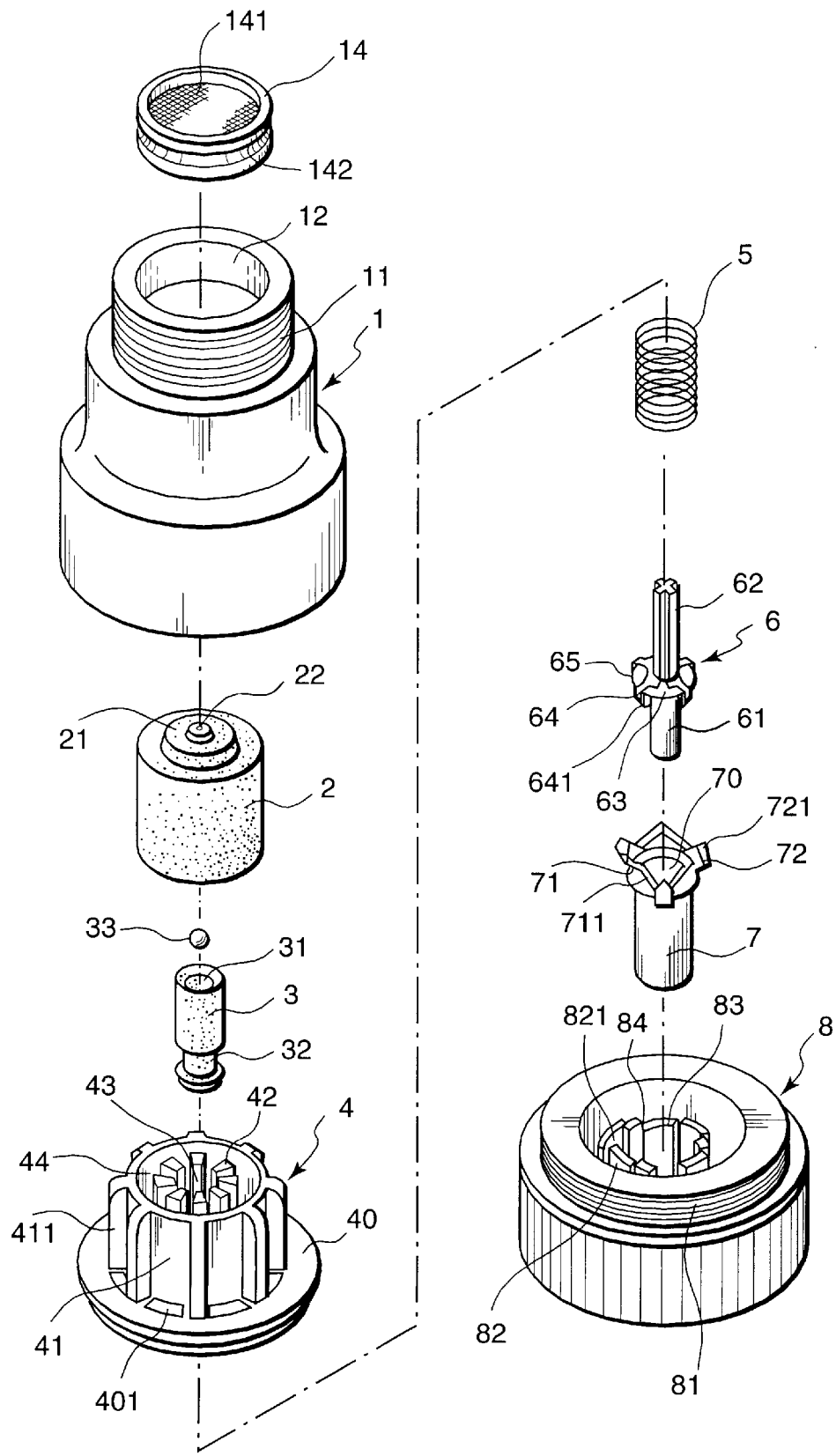
FIG. 1 is an exploded view of a water flowrate control device according to the present invention.
Figure 2:
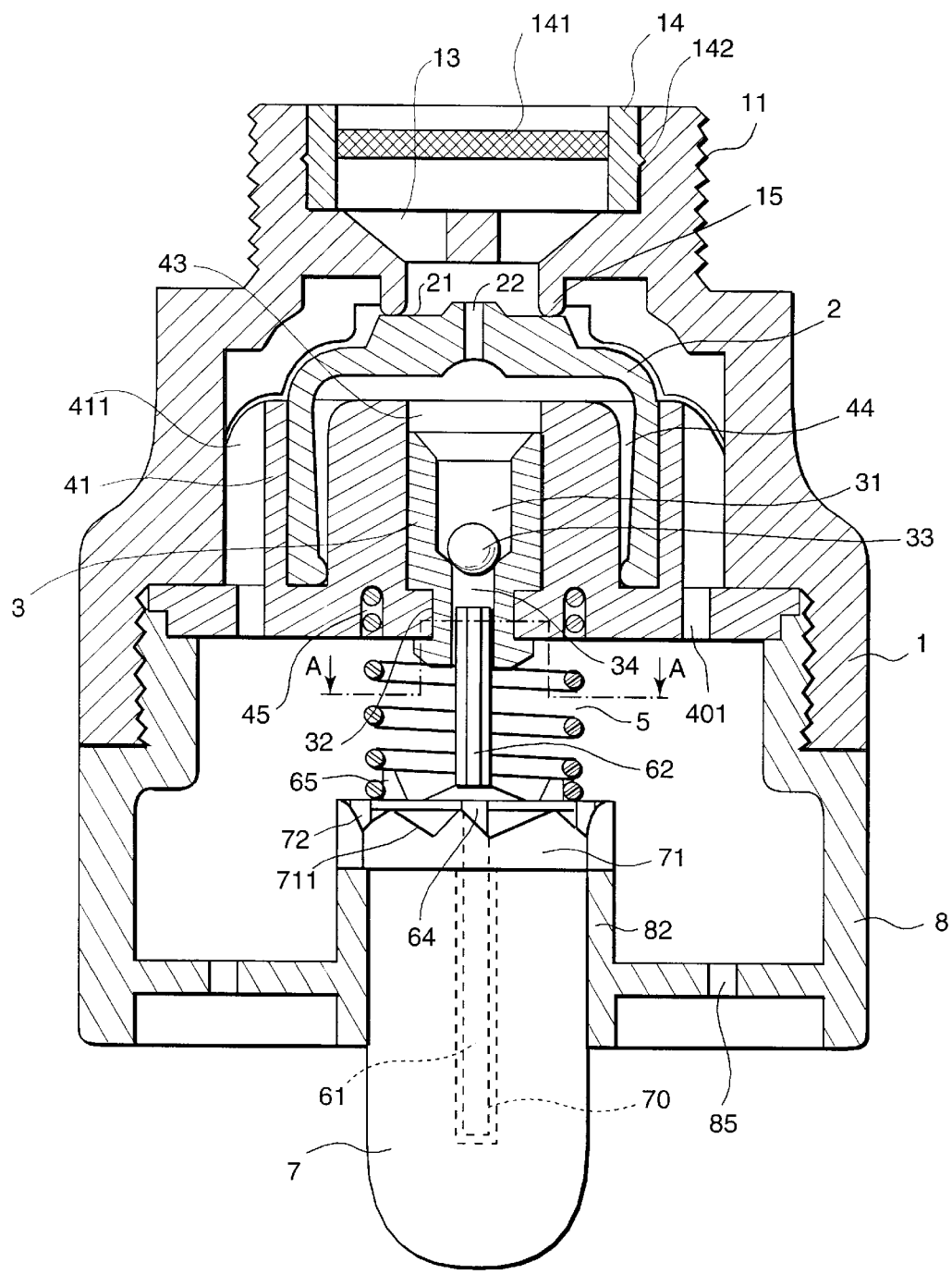
FIG. 2 is a sectional assembly view of the present invention, showing the rubber cap stopped at the inside annular flange of the casing, the water passage through the inside annular flange of the casing stopped.

Referring to FIGS. 1 and 2, a water flowrate control device in accordance with the present invention is generally comprised of a casing 1, a rubber cap 2, a pressure release element 3, a steel ball 33, a holder member 4, a spring member 5, a movable member 6, a receptacle 7, and a bottom cap 8.

Figure 5:
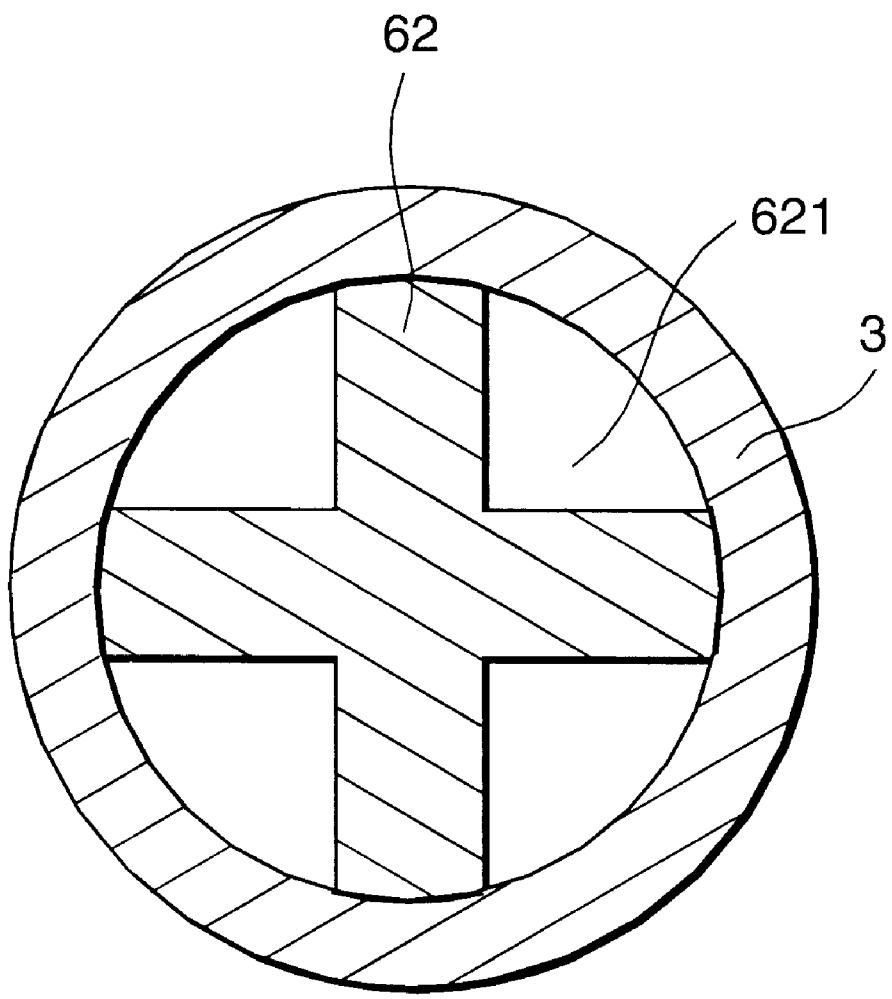
FIG. 5 is a sectional view in an enlarged scale taken along line A—A of FIG. 2.

The casing 1 is a stepped, tubular member having a water inlet 12 at its top end, a threaded neck 11 around the water inlet 12 for connection to a water pipe, an inside annular flange 15 below the water inlet 12, and a grille 13 disposed between the water inlet 12 and the inside annular flange 15. A water filter 14 is mounted within the water inlet 12. The water filter 14 comprises a wire gauze 141 suspended within the circular shell thereof, and a mounting flange 142 raised around the periphery of the circular shell. The diameter of the mounting flange 142 is slightly greater than the inner diameter of the water inlet 12. By press-fitting the mounting flange 142 into the water inlet 12, the water filter 14 is fixed to the casing 1. The bottom end of the casing 1 is internally threaded for the connection of the bottom cap 8. The holder member 4 comprises a flat, circular bottom plate 40, an annular groove 45 at the bottom side wall of the bottom plate 40, an endless upright outer wall 41 raised from the top side wall of the bottom plate 40, a plurality of longitudinal ribs 411 spaced around the endless upright outer wall 41, a split, endless upright inner wall 42 raised from the bottom plate 40, a first receiving space 43 defined within the upright inner wall 42, a second receiving space 44 defined within the upright outer wall 41 around the upright inner wall 42, a center through hole (not shown) through the center of the bottom plate 40 in communication with the first receiving space 43, and a plurality of water holes 401 respectively provided through the bottom plate 40 around the upright outer wall 41 and between each two adjacent longitudinal ribs 411. The pressure release element 3 is a hollow cylindrical member comprising a longitudinal top center hole 31 extended to the top end thereof, a longitudinal bottom center hole 34 extended from the bottom end of the longitudinal top center hole 31 to the center of the bottom end thereof, and a neck 32 near the bottom end. The pressure release element 3 is mounted in the first receiving space 43 in the holder member 4 and press-fitted into the center through hole at the center of the bottom plate 40 of the holder member 4, enabling the neck 32 to be engaged with the bottom plate 40 of the holder member 4. The outer diameter of the steel ball 3 is smaller than the longitudinal top center hole 31 but greater than the longitudinal bottom center hole 34. When the steel ball 3 is put in the longitudinal top center hole 31, it stops the longitudinal bottom center hole 34. The rubber cap 2 is molded from rubber, having a raised top 21 and a through hole 22 through the center of the raised top 21. After installation of the pressure release element 3 in the first receiving space 43 in the holder member 4, the rubber cap 2 is mounted in the second receiving space 44 in the holder member 4 and covered over the upright inner wall 42. The rubber cap 2 is preferably having a flanged inside wall for positive positioning on the upright inner wall 42. The movable element 6 comprises a base 63, a top rod 62 and a bottom rod 61 respectively raised from top and bottom sides of the base 63 in reversed directions. The top rod 62 is inserted into the bottom center hole 34 in the pressure release element 3, comprising a plurality of, for example, four equiangularly spaced and longitudinally extended grooves 621. When viewed from the top side, the top rod 62 shows a crossed cross section (see FIG. 5). The base 63 comprises a plurality of peripheral blocks 64 spaced around the periphery, and a plurality of projecting portions 65 raised from the top side wall thereof. The peripheral blocks 64 each have a sloping side 641. The spring member 5 has a top end positioned in the annular groove 45 at the holder member 4, and a bottom end supported on the base 63 of the movable element 6 around the projecting portions 65. The receptacle 7 holds the movable element 6 in the bottom cap 8, comprising a top receiving hole 70, which receives the bottom rod 61 of the movable element 6, an inner cam 71 disposed around the top receiving hole 70, and an outer cam 72 disposed around the inner cam 71. The inner cam 71 has a plurality of ʌ-shaped top surface portions 711 arranged at an inner side. The outer cam 72 has a plurality of ʌ-shaped top surface portions 721 arranged at an outer side. After insertion of the bottom rod 61 of the movable element 6 into the top receiving hole 70 at the receptacle 7, the peripheral blocks 64 are respectively engaged with the inner cam 71 and the outer cam 72. The bottom cap 8 comprises a threaded top coupling end 81 threaded into the internally threaded bottom end of the casing 1, a substantially tubular flange 82 suspended on the inside, a cam 83 at the top of the flange 82, a plurality of positioning grooves 821 provided at the tubular flange 82 on the inside for the positioning of the outer cam 72 of the receptacle 7, and a plurality of water holes 85 spaced around the flange 82.

Figure 3:
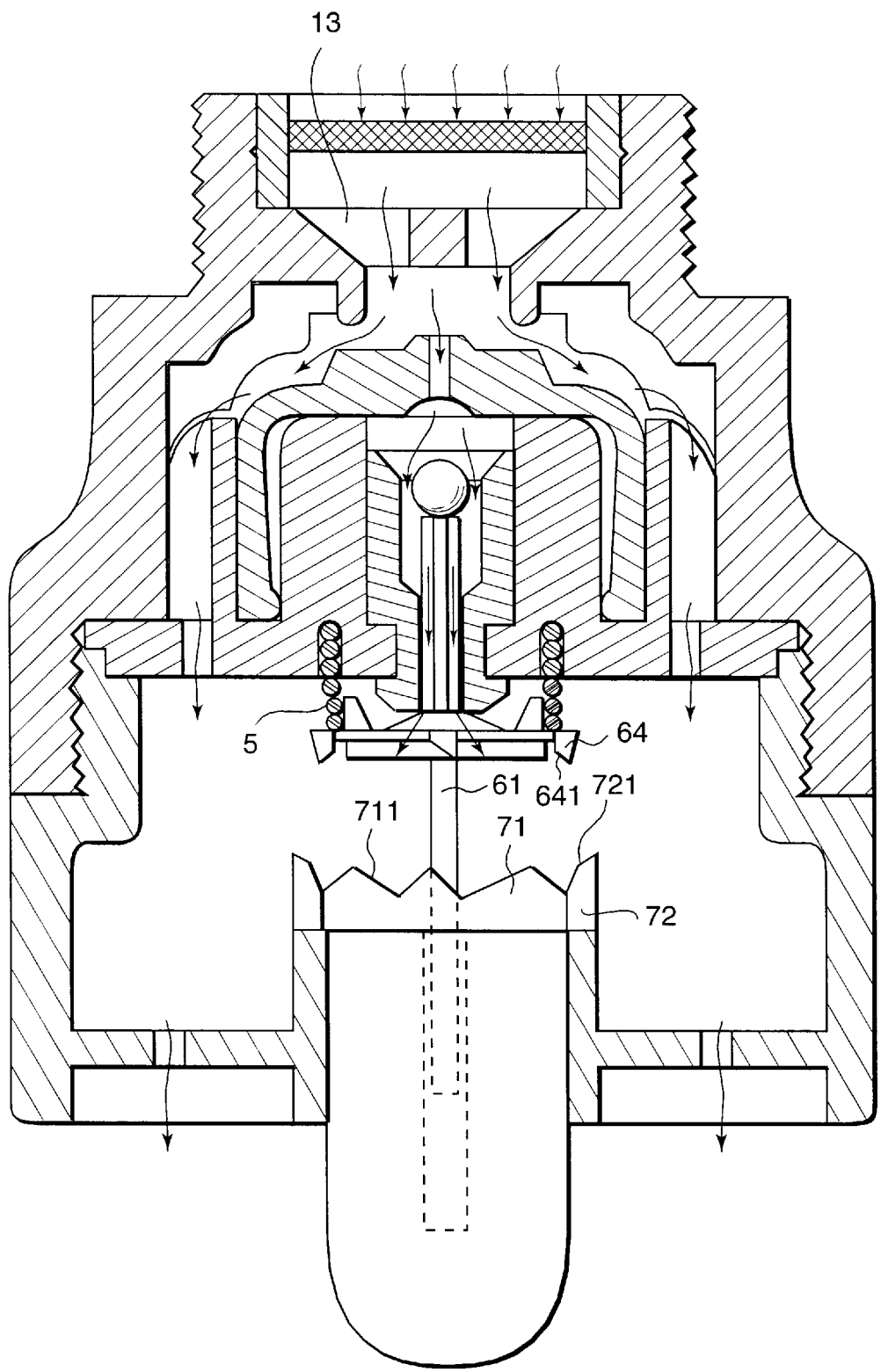
FIG. 3 is another sectional view of the present invention, showing the steel ball lifted from the longitudinal bottom center hole of the pressure release element, the rubber cap compressed, water passed through the inside annular flange of the casing, the water holes at the holder member and the water holes at the bottom cap.
Figure 4:
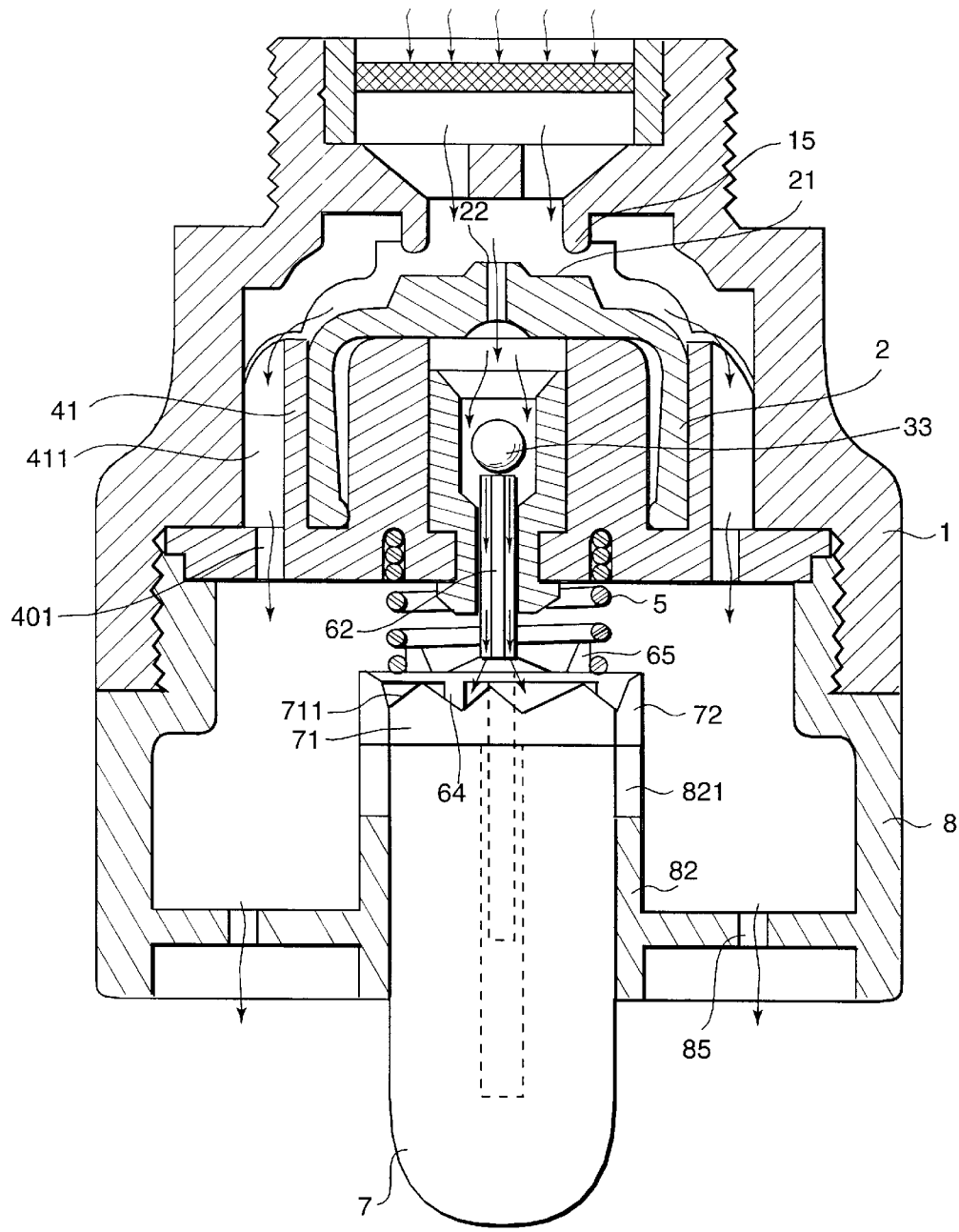
FIG. 4 is similar to FIG. 3 but showing the steel ball lowered with the movable element.

Normally, the steel ball 33 stops the longitudinal bottom center hole 34 of the pressure release element 3 (see FIG. 2), and water passes from the water inlet 12 through the through hole 22 into the inside space of the rubber cap 2, and at the same time the space outside the rubber cap 2 within the inside annular flange 15 of the casing 1 is also filled up with water, i.e., the water pressure inside the rubber cap 2 and the water pressure outside the rubber cap 2 are balanced, thereby causing the raised top 21 of the rubber cap 2 to be stopped at the inside annular flange 15, and therefore water is stopped from passing through the grille 13. When pushing the receptacle 7 upwards, the ʌ-shaped top surface portions 721 of the outer cam 72 are forced against the sloping side 641 of each of the peripheral blocks 64, thereby causing the movable element 6 to be lifted and rotated to push the steel ball 33 upwardly away from the longitudinal bottom center hole 34 for enabling water to flow out of the inside space of the rubber cap 2 through the longitudinal bottom center hole 34 of the pressure release element 3 and the grooves 621 at the top rod 62 of the movable element 6 (see FIG. 5). When water flows out of the inside space of the rubber cap 2, the rubber cap 2 is compressed by outside water to open the inside annular flange 15 (see FIG. 3, enabling water to flow out of the grille 13 and the inside annular flange 15, and then to flow through the water holes 401 at the bottom plate 40 of the holder member 4 out of the bottom cap 8 via the water holes 85. At this time, the peripheral blocks 64 are moved to the topmost edge at the cam 83 and stopped at a respective stop edge 84, enabling the movable element 6 to be retained in the lifted position for allowing water to be continuously flowing out of the bottom cap 8 (see FIG. 4). When pushing the receptacle 7 again, the movable element 6 is lifted and rotated through an angle, thereby causing the peripheral blocks 64 of the movable element 6 to be lowered to the lowest edge at the cam 83, and therefore the steel ball 33 falls to the bottom side of the longitudinal top center hole 31 to stop the longitudinal bottom center hole 34 again (see FIG. 2).

While only one embodiment of the present invention has been shown and described, it will be understood that various modifications and changes could be made thereunto without departing from the spirit and scope of the invention.

What the invention claimed is:

1. A water flowrate control device comprising:

a casing, said casing comprising a water inlet at a top side thereof, and an inside annular flange below said water inlet;

a holder member mounted inside said casing and suspended below said inside annular flange, said holder member comprising a flat, circular bottom plate having a top side and a bottom side, an endless upright outer wall raised from the top side of said bottom plate, a split, endless upright inner wall raised from the top side of said bottom plate, a first receiving space defined within said upright inner wall, a second receiving space defined within said upright outer wall around said upright inner wall, a center through hole through the center of said bottom plate in communication with said first receiving space, and a plurality of water holes respectively provided through said bottom plate around said upright outer wall;

a pressure release element mounted in the first receiving space inside said holder member and secured to the center through hole at the center of the bottom plate of said holder member, said pressure release element comprising a longitudinal top center hole extended to a top side thereof, and a longitudinal bottom center hole downwardly extended from said longitudinal top center hole to the center of a bottom side thereof;

a steel ball put in the longitudinal top center hole in said pressure release element to stop the longitudinal bottom center hole of said pressure release element, said steel ball having an outer diameter smaller than the longitudinal top center hole of said pressure release element but greater than the longitudinal bottom center hole of said pressure release element;

a rubber cap mounted in the second receiving space in said holder member and covered over the upright inner wall of said holder member and said pressure release element and stopped against said inside annular flange of said casing, said rubber cap comprising a center through hole disposed in communication with said water inlet through the inside space of said inside annular flange of said casing;

a bottom cap fastened to said casing at a bottom side, said bottom cap comprising a substantially tubular flange suspended on the inside, a cam at said tubular flange at a top side, a plurality of positioning grooves provided at said tubular flange on the inside, and a plurality of water holes spaced around said tubular flange for guiding water out of said casing;

a receptacle mounted in the tubular flange in said bottom cap, said receptacle comprising a top receiving hole, an inner cam disposed around said top receiving hole, and an outer cam disposed around said inner cam and positioned in the positioning grooves at said bottom cap;

a movable element mounted in said receptacle, said movable element comprising a base supported above said receptacle, a top rod upwardly raised from said base and inserted into the longitudinal bottom center hole of said pressure release element, and a bottom rod downwardly extended from said base and inserted into the top receiving hole at said receptacle, said top rod having a plurality of equiangularly spaced and longitudinally extended grooves, said base comprising a plurality of peripheral blocks spaced around the periphery thereof and respectively supported between said outer cam and said inner cam at said receptacle, and a plurality of projecting portions raised from a top side wall thereof; and a spring member connected between the bottom plate of said holder member and the projecting portions at the base of said movable element;

wherein when said receptacle is pushed upwards, said movable element is moved with said receptacle to push said steel ball upwardly away from the longitudinal bottom center hole of said pressure release element for enabling water to flow out of the inside space of said rubber cap so that said rubber cap is compressed by water pressure in the inside annular flange of said casing and released from the inside annular flange of said casing for enabling water to flow through the water holes at the bottom plate of said holder member and the water holes at said bottom cap to the outside of said casing.

2. The water flowrate control device of claim 1 wherein the water inlet of said casing is mounted with water filter means.

3. The water flowrate control device of claim 1 wherein said casing comprises a threaded neck around said water inlet for fastening to a water outlet of a water tap.

4. The water flowrate control device of claim 1 wherein said holder member comprises a plurality of longitudinal ribs spaced around said endless upright outer wall.

5. The water flowrate control device of claim 1 wherein the bottom plate of said holder member comprises an annular groove at the bottom side thereof for the positioning of one end of said spring member.

6. The water flowrate control device of claim 1 wherein the top rod of said movable element has a crossed cross section.

7. The water flowrate control device of claim 1 wherein said pressure release element comprises a neck fastened to the center through hole at the bottom plate of said holder member.

* * * * *